Aug. 7, 1962 T. LOCK 3,048,811

SOCKET CONNECTOR FOR PRINTED CIRCUIT BOARD

Filed Sept. 26, 1958

Inventor
Tom Lock
By
Attorney

United States Patent Office 3,048,811

Patented Aug. 7, 1962

3,048,811
SOCKET CONNECTOR FOR PRINTED CIRCUIT BOARD

Tom Lock, Kingsthorpe, Northampton, England, assignor to Painton & Company Limited, Kingsthorpe, England, a British company Filed Sept. 26, 1958, Ser. No. 763,608
Claims priority, application Great Britain Sept. 26, 1957
5 Claims. (Cl. 339—176)

This invention concerns improvements in or relating to electrical plug and socket connectors and more particularly to connectors for making electrical connections to extremely small electronic units such as for example transistorised printed wiring units.

The development of printed wiring, e.g. the mounting of the components of a circuit on a board, panel or sheet (hereinafter called "board") of insulating material on which the electrical connections between components are provided by metallic paths, for example formed of metal foil, on, or in, the surface of the board, and the use of transistors in place of thermionic valves have enabled the size of electrical apparatus to be made extremely small compared with the size that the same apparatus would have using more conventional circuit elements and methods of circuit construction. Apart from the actual reduction in size produced by the use of the comparatively small transistors in place of the much larger thermionic valves, transistors require lower operational voltages and the use of such lower voltages enables live parts to be separated by a smaller spacing, e.g. a spacing between centers of as little as 0.1 in. This technique calls for a plug and socket unit for making electrical connections to the board which unit also has a spacing of only 0.1 in. between adjacent contacts.

A similar situation exists as regards space where the modern miniature components making up an electronic circuit are mounted by resin encapsulation of all the components in a block. This is usually known as potting. The volume occupied by the whole circuit is very small and the plug and socket for forming electrical connections must be correspondingly small. Thus twenty electrical connections may be required in a plug assembly of less than 1 square inch.

Moreover, multiple coaxial plug and socket connectors are also required in very small sizes.

In these plug and socket connectors the important element is the socket contact. The row or rows of such contacts have to engage with a corresponding number of plug blades and each has to exert a reliable spring pressure on its corresponding blade to provide good electrical connection, whilst at the same time permitting easy separation of the plug unit from the socket unit. There is therefore a problem to provide tiny spring contacts, readily mass produced, with consistent dimensions and spring properties, and free from edges or minute burrs. This last feature is particularly important where the printed wiring at the edge of the board is used as the plug unit since a very smooth contact face is necessary to avoid damage to the delicate plug contact. These contact faces may be formed of foil having a thickness of the order of 0.0015 inch and glued to the printed circuit board.

It is an object of this invention to provide an easily and cheaply made socket connector and socket contact for the latter and which satisfactorily meets the aforementioned problem.

According to this invention, the socket contact is formed from spring wire which has a smooth rounded cross-sectional form and is bent to a very simple form.

Since the socket contact according to this invention is formed from wire having a smooth rounded cross-sectional form, any twisting or misalignment of such contact part relatively to a blade contact being engaged therewith does not result in damage to the blade contact as would occur if the said contact part were formed of flat strip. Further, the dimensional tolerance and the temper of the contact according to this invention may normally be kept to closer limits that those of a flat strip and consequently very small contacts of wire may be formed more accurately and to give a more uniform spring pressure than would those of flat strip. In addition, for a given cross-sectional area a wire has a greater strength and resilience than a flat strip and a contact which is of very small size, but has a sufficient spring pressure, can be produced from wire.

Although the said wire could be of any suitable smooth rounded cross-sectional form, and could, for example, be of elliptical form, preferably, according to a further feature of this invention, the said wire has a circular cross-section.

A circular cross-section for the wire gives the latter maximum strength and resilience for minimum width and thus facilitates the making of very small contacts and connectors. By using, for the socket contact, wire having a circular cross section of 0.015 inch diameter, connectors may be made according to this invention with a spacing of at little as 0.1 inch between the centers of the contacts.

In order that this invention may more readily be understood, reference will now be made to the accompanying drawings in which.

Figures 1, 2, 3:
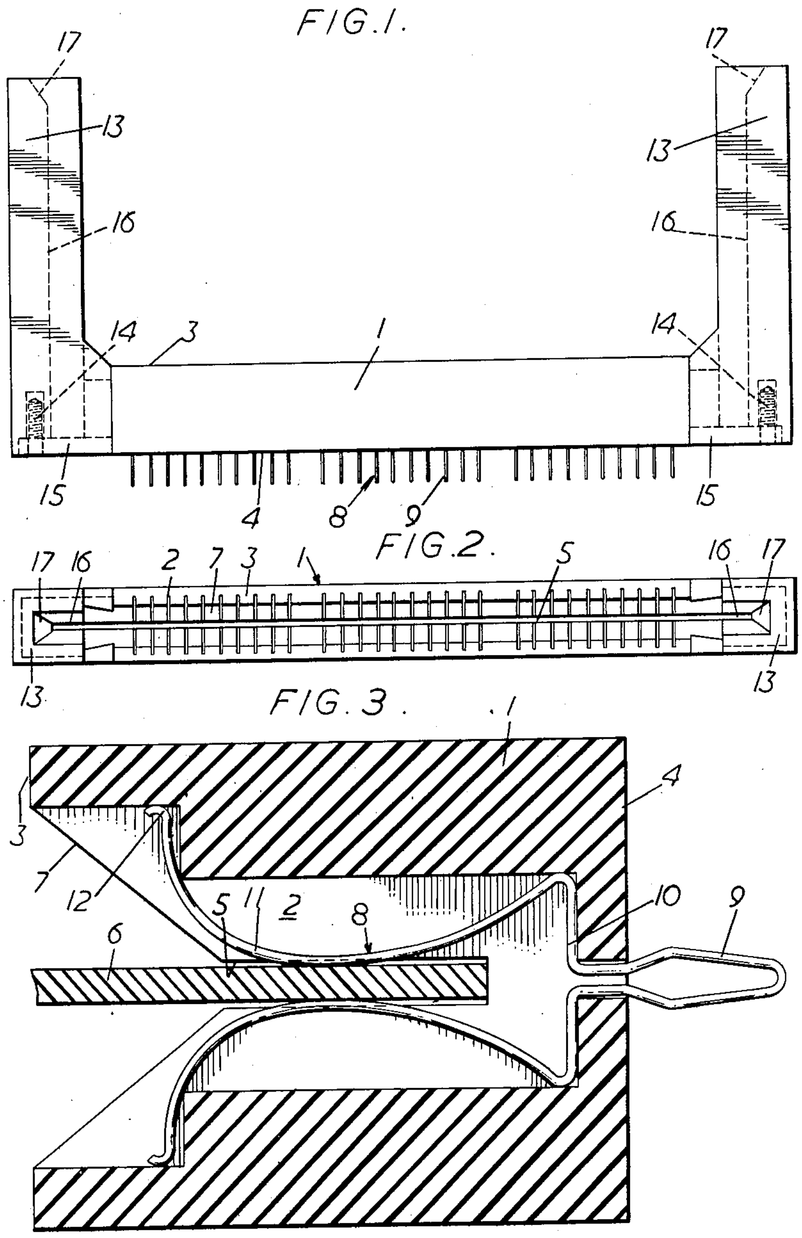
FIGURE 1 is a plan view of a socket connector according to this invention and having socket contacts adapted to mate electrically with contacts on the edge of a printed circuit board.
FIGURE 2 is a front elevation of the connector of FIGURE 1.
FIGURE 3 is a cross-section on an enlarged scale through one contact receiving channel of the connector of FIGURES 1 and 2 and showing the edge of a printed circuit board engaged therein.

The socket connector is intended to receive the edge of a printed circuit board provided with a plurality of uniformly spaced blade contacts formed by the printed wiring thereof.

The connector comprises an elongated rectangular parallelepipedonal holder 1 formed of an electrically insulating material, conveniently a thermoset synthetic resin material, and having, in this example, a width of about 0.8 inch, a depth of about one inch and a length sufficient to provide the required number of sockets, which in this example is thirty, each of a width of the order of 0.03 inch and spaced uniformly along the length of the holder by a distance equal to the spacing of said blade contacts, i.e. a distance of the order of 0.2 inch.

Each of the said sockets comprises a narrow recess 2 arranged centrally of the width of the holder and having its direction of length along the direction of width of the holder. Each recess 2 has the width required for the sockets, i.e. 0.03 inch, and extends in depth from the front face 3 of the holder 1 completely through to the rear face 4 thereof, having for most of its depth a length equal to slightly less than half the width of the holder, but being abruptly enlarged, e.g. to about 0.6 inch, at the region where it opens at the front face 3 of the holder and abruptly restricted, e.g. to about 0.07 inch, at the region where it emerges through the rear face 4 of the holder.

Centrally of its width, the holder 1 is provided along its entire length with a slot 5 of a width, i.e. of the order of 0.08 inch, sufficient to receive the printed circuit board (as shown at 6 in FIGURE 3) with a slight clearance on both sides thereof, this slot 5 extending in depth for about three quarters of the depth of the holder. To facilitate the correct central registration of the board 6 with the slot 5, a flared mouth 7 is provided to the slot 5, such mouth opening out to a width at the front face 3 of the holder equal to the length of each of said chambers at such face.

A socket contact 8 is located in each recess 2, each such contact being formed from a length of spring wire of circular cross-section and having in this example, a diameter of 0.020 inch. The contact 8 comprises a connection shank 9 by which electrical connections may be made to the contact, two abutment parts 10 extending outwardly in opposite directions transversely, and preferably perpendicularly as shown, of the shank 9 and forwardly thereof and two spaced curvilinear resilient bearing portions 11 extending forwardly from the outer ends of the abutment parts 10 and first converging towards one another, but then diverging again, these bearing portions 11 being adapted, when the printed circuit board 6 is received in the slot 5 in the holder as shown in FIGURE 3, to bear resiliently one on each surface of the printed circuit board 6, one of the bearing portions 11 making contact with a blade contact provided on one surface of such board.

In the construction of the socket contact 8, the length of wire used is first doubled upon itself to form the shank 9 and then the two end portions of the wire are bent outwardly away from one another at right angles to the shank to form the abutment parts 10 and are then bent forwardly to form the bearing portions 11. The extreme forward end parts 12 of the bearing portions 11 are separated by a distance substantially equal to the enlarged length of the chamber 2 at the front face 3 of the holder and are bent slightly inwardly towards one another. The contact 8 so formed is inserted into its chamber 2 through the front face 3 of the holder and pushed therein until the shank 9 passes through the restricted part of the chamber at the rear face 4 of the holder and the abutment parts 10 engage against the shoulders formed at the rear of the chamber by the restriction thereof. At this point, the extreme forward end parts 12 of the contact engage the outer walls of the recess within the enlargement thereof in the front face 3 of the holder and cause the arcuate bearing portions 11 of the contact to be separated from each other by a distance less than the thickness of the printed circuit board 6. The contact 8 is then locked in the holder 1 by the two side-by-side parts of the shank 9 of the contact being forced apart to a separation greater than the length of the restriction of the recess.

It will be appreciated that the above described socket connector is of a small and simple, but robust, construction and is capable of receiving the edge of a printed circuit board to mate together the socket contacts of the connector with the blade contacts on the printed circuit board, whilst causing the latter contacts no damage.

At its ends, the holder 1 is provided with guides 13 for the sides of the printed circuit board 6, such guides 13 projecting forwardly of the holder 1 and being secured to the latter by screws 14 which screw through end extensions 15 of the holder and into the guides 13. The guides 13 have grooves 16 in their inner surfaces to receive the sides of the printed circuit board 6 and the flared mouths 17 are provided to these grooves 16.

In tests carried out on a 15-way socket connector of the form illustrated for receiving the edge of a printed wiring board, the average contact resistance before use of the connector was 0.030 ohm, the maximum deviation over the fifteen contacts being 0.0025. After one thousand couplings and uncouplings of the board to the connector, the average contact resistance was 0.033 ohm, and the maximum deviation was 0.016. Only slight wear was noticeable on the edge of the board.

I claim:

1. A multi-contact electrical connector comprising a plate, a plurality of plug contacts closely spaced along the length and extending transversely to an edge of said plate, an elongated body part, a longitudinally extending slot formed in said body part to receive said plate edge-on, slit-like recesses formed in said body part in closely spaced relationship and extending transversely of said slot on either side thereof, a wall of each such recess at one side of said slot co-operating with an opposed wall of a corresponding recess at the other side of said slot and with said slot to provide a channel extending through said body part, and a bifurcated socket contact in each said channel, adapted to embrace said plate when inserted in said slot and to mate with one of said plug contacts, each such socket contact being formed from a single length of spring wire of smooth cross-sectional form by bending of such wire to provide two resilient inwardly bowed contact portions, said contact portions being adapted to be resiliently deformed into engagement with said plate upon insertion of said plate rearwardly into said slot, said bowed portions of each said socket contact sliding away from one another during such deformation, while being laterally supported in the channel in which they are disposed, and having their front ends bearing against and sliding on said opposite walls of said channel.

2. The multi-channel electrical connector specified in claim 1 in which said body part has shoulder means restricting each said channel at the rearward part thereof and in which the wire forming each socket contact is doubled at a point of its length intermediate between said contact portions so as to provide a shank having two side-by-side limbs, said limbs being resiliently deformable so as to allow said shank to be slid respectively rearwardly and forwardly past said shoulder means, into and out of a position in which said shank projects out of said body part for the making of an electrical connection thereto, and said limbs being biased outwardly away from one another so as positively to locate said shank in said position.

3. The multi-contact electrical connector specified in claim 1, including co-operating means on said plate and on said body part, adapted to locate said plate endwise in said slot.

4. The multi-contact electrical connector specified in claim 1, having a web on said body part, extending transversely of said slot and said plate being formed with a cut-out mating with said web, so as to locate said plate and said plug contacts carried thereby endwise relatively to said socket contacts.

5. An electrical connector comprising a plate, a plug contact extending transversely to an edge of said plate, a body part, a slot formed in said body part to receive said plate edge-on, a slit-like recess formed in said body part and extending transversely of said slot on either side thereof, a wall of such recess at one side of said slot co-operating with an opposed wall of such recess at the other side of said slot and with said slot to provide a channel extending through said body part, and a bifurcated socket contact in said channel adapted to embrace said plate when inserted in said slot and to mate with said plug contact, such socket contact being formed from a single length of spring wire of smooth cross-sectional form by bending of such wire to provide two resilient inwardly bowed contact portions, said contact portions being adapted to be resiliently deformed into engagement with said plate upon insertion of said plate into said slot, said bowed portions of said socket contact sliding away from one another during such deformation while being laterally supported in the channel in which they are disposed, and having their front ends bearing against and sliding on said opposite walls of said channel.

(References on following page)

References Cited in the file of this patent

UNITED STATES PATENTS

| | | |
|---|---|---|
| 1,735,133 | Schmidt | Nov. 12, 1929 |
| 1,997,756 | Stamy | Apr. 16, 1935 |
| 2,291,808 | Henning | Aug. 4, 1942 |
| 2,598,824 | O'Neill et al. | June 3, 1952 |
| 2,641,746 | Keller | June 9, 1953 |
| 2,691,147 | Sutton et al. | Oct. 5, 1954 |
| 2,699,534 | Klostermann | Jan. 11, 1955 |
| 2,750,572 | Fox | June 12, 1956 |
| 2,761,114 | Franklin | Aug. 28, 1956 |
| 2,869,107 | Engel | Jan. 13, 1959 |
| 2,875,425 | Gilbert | Feb. 24, 1959 |
| 2,882,514 | Krantz | Apr. 14, 1959 |

FOREIGN PATENTS

| | | |
|---|---|---|
| 72,057 | Holland | Apr. 15, 1953 |
| 516,813 | Belgium | July 9, 1953 |
| 572,018 | Great Britain | Sept. 17, 1945 |